(12) United States Patent
Lee

(10) Patent No.: US 7,959,231 B2
(45) Date of Patent: Jun. 14, 2011

(54) ARMREST FOR MULTIPLE SEATING

(76) Inventor: James Shing Hin Lee, Kowloon (HK)

( * ) Notice: Subject to any disclaimer, the term of this patent is extended or adjusted under 35 U.S.C. 154(b) by 0 days.

(21) Appl. No.: 12/791,296

(22) Filed: Jun. 1, 2010

(65) Prior Publication Data

US 2010/0295358 A1     Nov. 25, 2010

Related U.S. Application Data

(63) Continuation of application No. PCT/GB2008/003975, filed on Nov. 28, 2008.

(30) Foreign Application Priority Data

Nov. 29, 2007   (GB) .................................. 00723404.0

(51) Int. Cl.
*B60N 2/46* (2006.01)
*B64D 11/00* (2006.01)
*B64D 11/06* (2006.01)
*A47C 1/12* (2006.01)
*A47C 7/54* (2006.01)

(52) U.S. Cl. ................ 297/411.2; 297/411.45; 297/248; 244/118.5; 244/118.6; 244/122 R; 248/118

(58) Field of Classification Search ............... 297/411.2, 297/411.45, 248; 248/118; 244/122 R, 118.5, 244/118.6
See application file for complete search history.

(56) References Cited

U.S. PATENT DOCUMENTS

| 1,802,620 | A | * | 4/1931 | Scully ........................... 297/113 |
| 2,541,756 | A | * | 2/1951 | Goodman ............ 297/411.45 X |
| 3,893,729 | A | * | 7/1975 | Sherman et al. .......... 297/232 X |
| 4,186,964 | A | * | 2/1980 | Marrujo et al. .......... 297/411.45 |
| D369,706 | S | * | 5/1996 | Olson ............................ D6/501 |
| 5,893,601 | A | | 4/1999 | Carlberg |
| 6,237,872 | B1 | * | 5/2001 | Bar-Levav ................. 244/118.6 |
| 2007/0241235 | A1 | * | 10/2007 | Atchison ................... 244/122 R |

FOREIGN PATENT DOCUMENTS

| FR | 2841511 A1 | 1/2004 |
| GB | 796613 | 6/1958 |

* cited by examiner

*Primary Examiner* — Rodney B White
(74) *Attorney, Agent, or Firm* — Mayback & Hoffman, P.A.; Gregory L. Mayback; Katie M. Blakley

(57) ABSTRACT

A dual plane armrest includes upper and lower forearm supports that overlap to permit respective use by neighbors. The upper support may be cut-away at the rear to accommodate the elbow of the user of the lower support. The upper forearm support is disposed above the lower forearm support partially or completely. The dual plane armrest provides increased lateral space for neighbors without increasing lateral seat pitch.

20 Claims, 4 Drawing Sheets

ARMREST FOR MULTIPLE SEATING

CROSS-REFERENCE TO RELATED APPLICATIONS

This is a continuing application, under 35 U.S.C. §120, of copending international application No. PCT/GB2008/003975, filed Nov. 28, 2008, which designated the United States and was published in English; this application also claims the priority, under 35 U.S.C. §119, of Great Britain Patent application No. 0723404.0, filed Nov. 29, 2007; the prior applications are herewith incorporated by reference in their entirety.

STATEMENT REGARDING FEDERALLY SPONSORED RESEARCH OR DEVELOPMENT n/a

FIELD OF THE INVENTION

The present invention lies in the field of seating. The present disclosure relates to an armrest for multiple seating and, particularly, to an armrest suitable for positioning between adjacent seats.

BACKGROUND OF THE INVENTION

Multiple seating consists of two or more adjacent seats disposed side-by-side in a row. Such seating is found in aircraft, but may also be found in other forms of transportation and in any place where a plurality of people congregate. Typically, such seating includes armrests, which have the function of defining an individual seating space and providing a support for the forearm. However, the lateral seat pitch is often small, and the armrest is suitable for a single use only. Simultaneous use of such an armrest is not possible and, as a result, adjacent users may become frustrated and annoyed because their armrest is in use by a neighbor.

In order to improve passenger comfort in aircraft whilst maintaining lateral seat pitch, it has been proposed to stagger adjacent seats so that the shoulders of adjacent passengers are not aligned.

It has also been proposed to arrange adjacent seats to face forwards and backwards. Such a configuration can give improved shoulder and elbow room. FIG. 1, for example, illustrates, in plan, a prior art aircraft seat configuration 10 having adjacent passengers facing in opposite directions. Elbow and shoulder room can be improved for a given lateral seat pitch, but engineering and certification problems arise in addition to poor perceived passenger acceptance. FIG. 2 shows, in plan, a prior art configuration of seats 20 in which a standard configuration 21 has lateral alignment. Elbow and shoulder room can be increased, as illustrated by the progressively greater stagger of seat arrangements 22, 23, 24. However, such staggered configurations also have engineering and certification problems, and may have poor customer acceptance.

Both prior proposals place passengers in unnatural positions and have low perceived acceptance. Both prior proposals also comprise relatively expensive solutions which may require substantial engineering changes to the supporting substrate.

SUMMARY OF THE INVENTION

The invention provides an armrest for multiple seating that overcomes the hereinafore-mentioned disadvantages of the heretofore-known devices of this general type.

According to the invention there is provided a dual plane armrest having two forearm supports disposed one above the other. In such an armrest, the dual planes may overlap partially or fully.

The principal advantage of the invention is that the provision of higher and lower level armrests has an affect on the disposition of the arm, whereby use of the upper plane tends to swing the arm relatively forward. Thus, the risk of adjacent elbows and/or shoulders being in conflict is reduced.

Thus, users of neighboring seats are provided with one or other forearm support of a common armrest and, accordingly, a low lateral seat pitch can be provided with increased seating comfort. The invention has particular application to economy class seating of aircraft.

In an exemplary embodiment of the invention, the forearm supports overlap substantially completely so that the width of the armrest according to the invention is about the same as a prior single plane armrest.

The armrest of the invention may take any suitable form. In an exemplary embodiment, a 'C' shape provides upper and lower forearm support planes linked by a substantially vertical upright. Alternatively, an 'S' or 'Z' shape similarly provides support planes linked by an angled upright. The upright may be a continuous web or may be constituted by a plurality of upright elements.

An armrest according to the invention is adapted to be hinged to a backrest or the like so as to be moved between stowed and deployed conditions. Furthermore the armrest of the invention is adapted for direct replacement of existing single plane armrests without modification or adjustment of the seat substrate.

In particular, and especially in relation to aircraft, safety certification is facilitated because minimal changes to the support structure are required.

Although the invention is illustrated and described herein as embodied in an armrest for multiple seating, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 3:
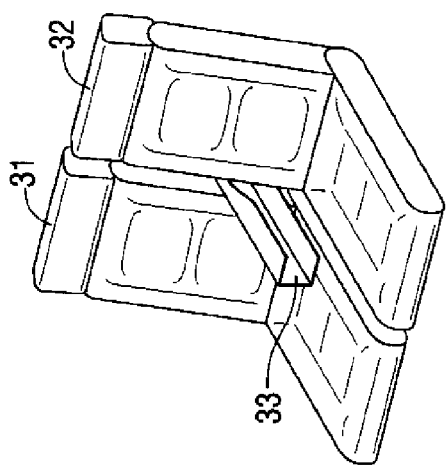
FIG. 3 is a front perspective view of adjacent seats with a common armrest according to the invention.

Described now are exemplary embodiments of the present invention. Referring now to the figures of the drawings in detail and first, particularly to FIG. 3, there is shown a first exemplary embodiment of the invention in which adjacent seats 31, 32 have a common substantially 'C' shaped armrest 33 having upper and lower support planes 34, 35 linked by a continuous substantially upright web 36.

Figure 4:
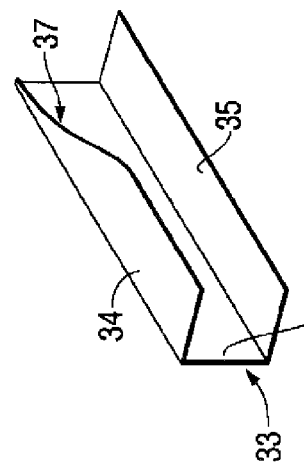
FIG. 4 is an enlarged front perspective view of the armrest of FIG. 3.

As best shown in FIG. 4, the upper support plane 34 has a cut-out 37 at the rear (adjacent the seat back) to provide room for a lower portion of an upper arm of a person (e.g., a passenger) using the lower support plane 35. It will be appreciated that the vertical web may be pierced to reduce weight or may be constituted by one or more narrow support elements.

Figure 1:
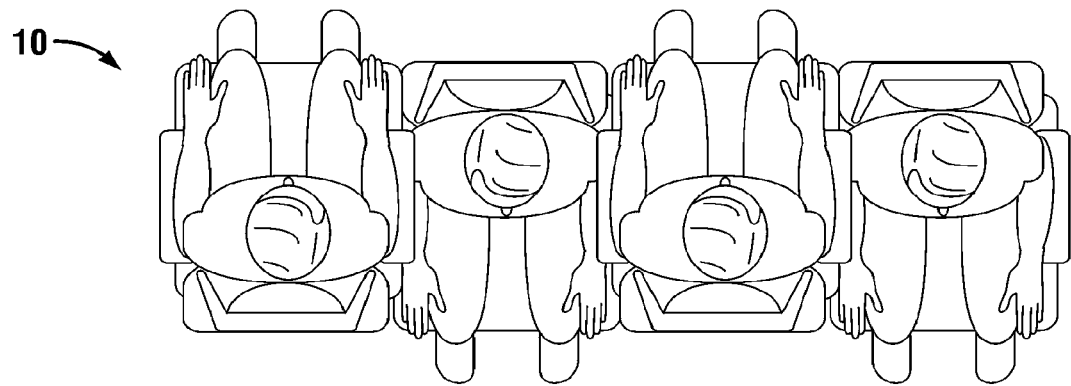
FIG. 1 is a plan view of an exemplary first prior art seating configuration.
Figure 2:
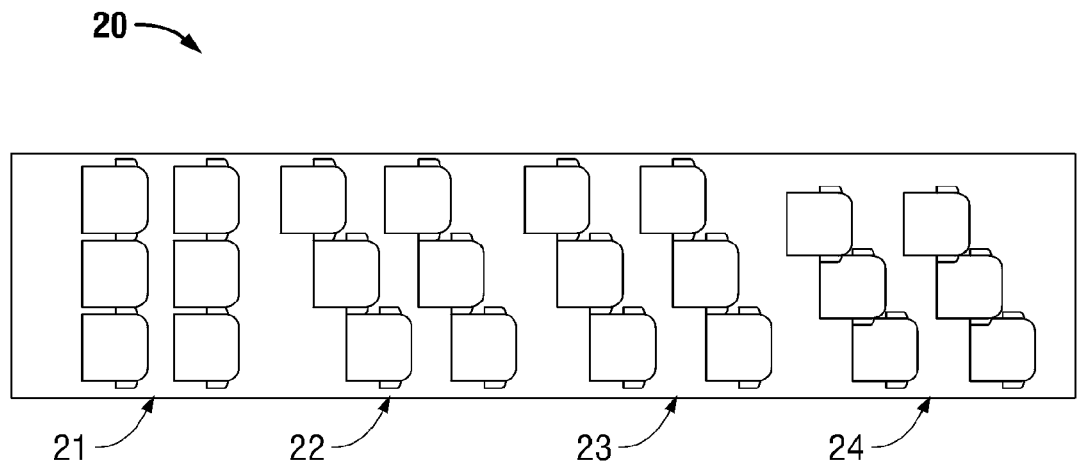
FIG. 2 is a plan view of a second exemplary prior art seating configuration.
Figure 5:
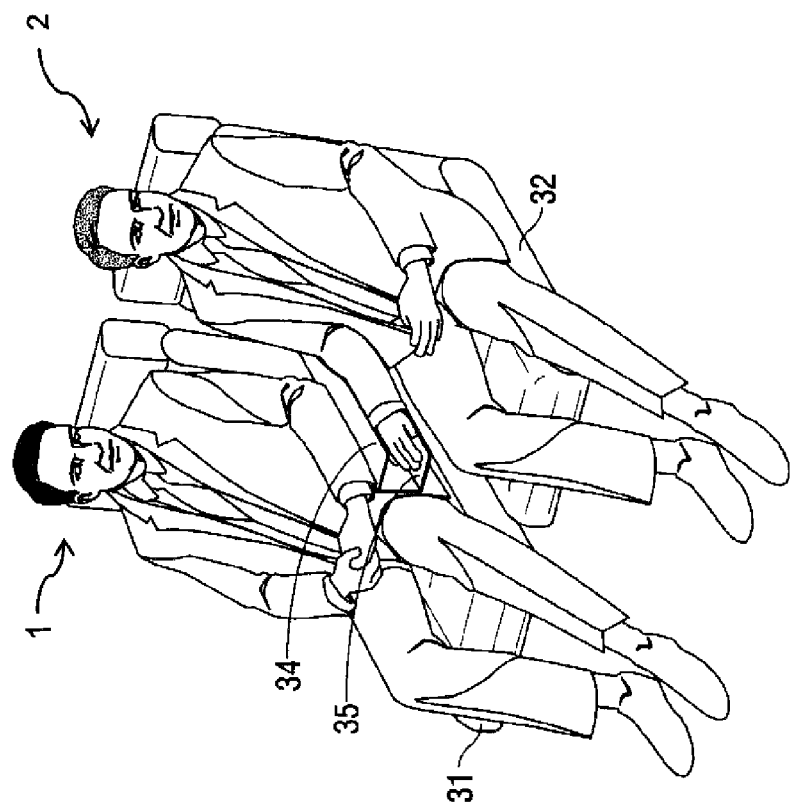
FIG. 5 is a front perspective view of the armrest of FIGS. 3 and 4 in use by adjacently seated people.

FIG. 5 schematically illustrates the armrest 33 in use whereby passenger 1 employs the upper support plane 34 and passenger 2 uses the lower support plane 35.

Figure 6:
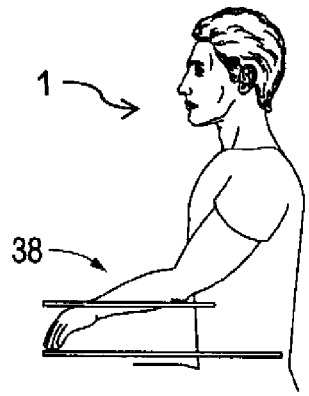
FIG. 6 is a fragmentary, diagrammatic side elevational view of a right neighbor using the armrest of FIG. 5 viewed from between the two users.
Figure 7:
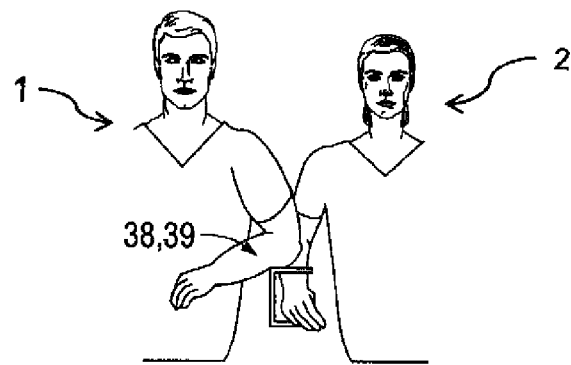
FIG. 7 is a fragmentary, diagrammatic front elevational view of the two neighbors using the armrest of FIG. 5 viewed from the front of the two users.
Figure 8:
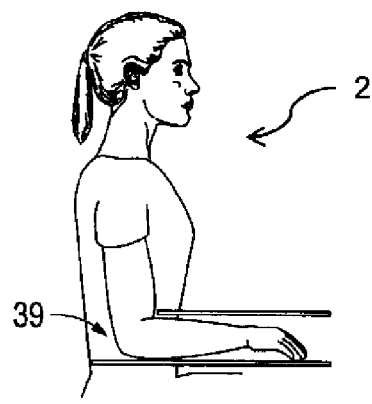
FIG. 8 is a fragmentary, diagrammatic side elevational view of a left neighbor using the armrest of FIG. 5 viewed from between the two users.
Figure 9:
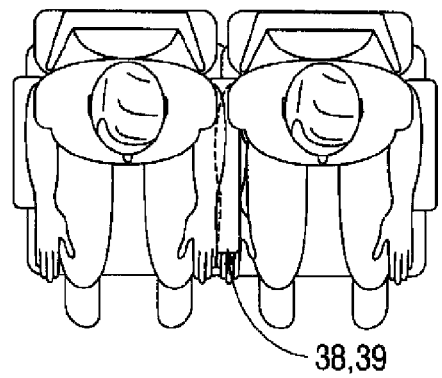
FIG. 9 is a fragmentary, diagrammatic top plan view of the two neighbors using the armrest of FIG. 5 viewed from above the two users.

FIGS. 6, 7, 8, and 9 illustrate in greater detail the disposition of the upper and lower support planes 34, 35 and the passenger's arm(s) associated therewith. In FIG. 6 passenger 1 uses the upper support plane 34, which tends to swing the arm and shoulder 38 slightly forward (to the left in FIG. 6). In FIG. 8, passenger 2 uses the lower support plane 35, which tends to swing the arm and shoulder 39 to the rear (to the left in FIG. 8). In front elevation (FIG. 7), the arms of the neighbors overlap to a slight extent giving more comfort and space to both passengers whilst maintaining an unchanged lateral seat pitch. The plan view of FIG. 9 also illustrates how the respective arms can overlap in comfort.

Figure 10:
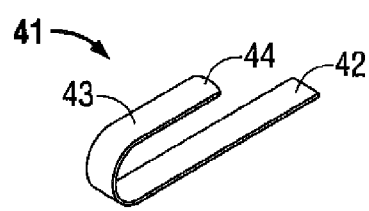
FIG. 10 is a perspective view of another alternative embodiment of the armrest according to the invention from the front and right side.

Alternative configurations of the invention are illustrated in FIGS. 10 to 19. In FIG. 10, for example, a C-shaped armrest 41 (when viewed from an elevational side thereof) is mounted on a seat substrate by the lower limb 42. The upper limb 43 is a cantilever from the front edge with free end 44 at a distance from the seat backrest. This distance allows elbow room for the passenger using the lower limb 42. The armrest 41 may have a solid upright side, or one or more legs, to support the upper limb, but such a support will define the seat associated with the lower limb and the seat associated with the upper limb.

Figure 11:
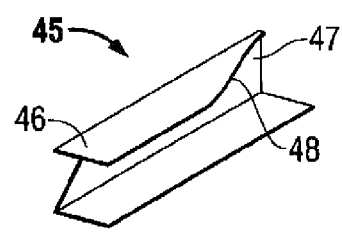
FIG. 11 is a perspective view of another alternative embodiment of the armrest according to the invention from the front and right side.

FIG. 11 illustrates another exemplary embodiment of the inventive armrest 45 with a Z-shaped section at the front 46 and an L-shaped section at the rear 47. An elbow cut-out 48 is provided for the right side passenger (as in the view of FIGS. 7 and 9). The change in section accommodates the generally diminishing bulk of an arm, from the elbow to the hand, and may be provided by a gradual curve.

Figure 12:
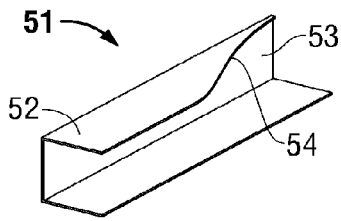
FIG. 12 is a perspective view of another alternative embodiment of the armrest according to the invention from the front and right side.
Figure 13:
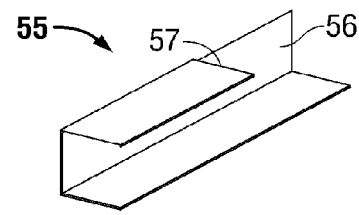
FIG. 13 is a perspective view of another alternative embodiment of the armrest according to the invention from the front and right side.

FIG. 12 shows an alternative exemplary armrest 51 having a C-shaped section at the front 52 and an L-shaped section at the rear 53. At elbow cut-out 54 is likewise provided. FIG. 13 is a variant 55 of the armrest of FIG. 12 in which the elbow cut-out 56 has a right-angled edge 57, rather than the curved transition 54.

Figure 14:
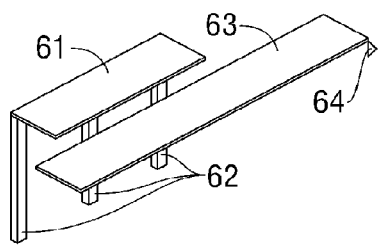
FIG. 14 is a perspective view of another alternative embodiment of the armrest according to the invention from the front and right side.
Figure 15:
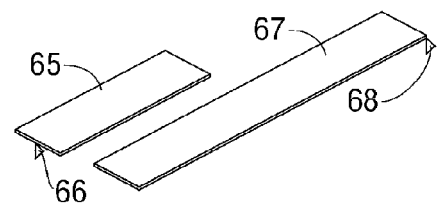
FIG. 15 is a perspective view of another alternative embodiment of the armrest according to the invention from the front and right side.

In FIG. 14, in still a further exemplary embodiment of the armrest invention, an upper limb 61 is supported on three legs 62 spaced along the length thereof. The lower limb 63 of the armrest is cantilevered from the seat back at mounting 64. Another exemplary embodiment of the armrest invention is shown in FIG. 15. There, the upper limb 65 is cantilevered from a front support 66 and the lower limb 67 is cantilevered from a rear support 68.

Figure 16:
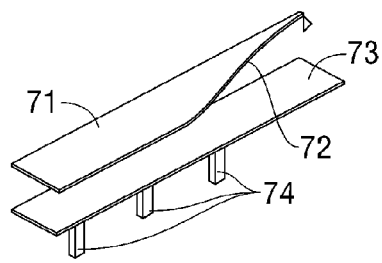
FIG. 16 is a perspective view of another alternative embodiment of the armrest according to the invention from the front and right side.
Figure 17:
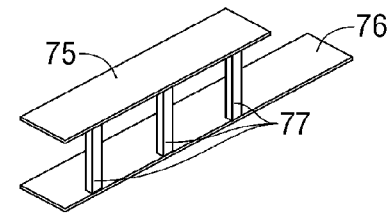
FIG. 17 is a perspective view of another alternative embodiment of the armrest according to the invention from the front and right side.

In FIG. 16, yet another exemplary embodiment of the armrest invention illustrates the upper limb 71 cantilevered from the rear, with an elbow cut-out 72. The lower limb 73 is supported from below by three legs 74. In comparison, in a further exemplary embodiment of the armrest invention, FIG. 17 shows the upper limb 75 supported on the lower limb 76 by three legs 77.

Figure 18:
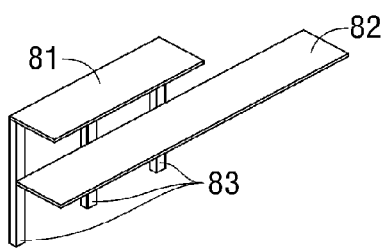
FIG. 18 is a perspective view of another alternative embodiment of the armrest according to the invention from the front and right side.
Figure 19:
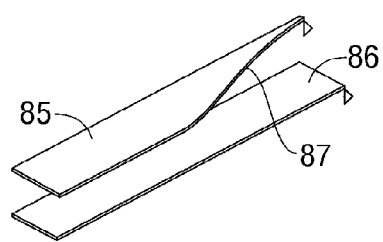
FIG. 19 is a perspective view of another alternative embodiment of the armrest according to the invention from the front and right side.

Next, an exemplary embodiment of the armrest invention shown in FIG. 18 illustrates both upper and lower limbs 81, 82 supported from below by three legs 83. Lastly, FIG. 19 shows both upper and lower limbs 85, 86 cantilevered from the rear, the upper limb having an elbow cut-out 87.

The foregoing examples are not an exhaustive list of armrest configurations, and it will be understood that where three upright supports are illustrated, more or less may be sufficient depending on normal design considerations. Likewise the lower limb may be accessible from the left side or from the right side, and elbow cut-outs of suitable shape and size may be provided if desired. Materials of construction are any suitable for providing the necessary functional, strength, and comfort requirements. The invention is particularly suitable for high density seating, such as provided in aircraft. However use of the invention in many kinds of transportation and public seating is envisaged.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

I claim:

1. A dual plane armrest comprising an upper forearm support and a lower forearm support, each having a lateral extent and a longitudinal extent, the upper forearm support being disposed above the lower forearm support, said upper forearm support being reduced in at least one of said lateral and longitudinal extents relative to said lower forearm support to accommodate an arm associated with said lower forearm support.

2. The dual plane armrest according to claim 1, wherein:
   said upper forearm support is reduced in said longitudinal extent relative to said lower forearm support; and
   said upper and lower forearm supports fully overlap one another in said lateral extent.

3. The dual plane armrest according to claim 1, wherein:
   said upper forearm support is reduced in said lateral extent relative to said lower forearm support such that said upper and lower forearm supports only partially overlap one another in said lateral extent.

4. The dual plane armrest according to claim 1, wherein said upper forearm support has a rear and is reduced laterally at said rear relative to the lower forearm support to accommodate the arm associated with said lower forearm support.

5. The dual plane armrest according to claim 4, wherein said upper forearm support is gradually reduced along said lateral extent of said upper forearm support.

6. The dual plane armrest according to claim 5, wherein said upper forearm support has a rear end and said lateral extent of said upper forearm support is substantially zero at said rear end.

7. The dual plane armrest according to claim 1, wherein said upper and lower forearm supports together have a front portion with a C-shaped section.

8. The dual plane armrest according to claim 1, wherein said upper and lower forearm supports together have a front portion with a Z-shaped section.

9. The dual plane armrest according to claim 1, wherein said upper and lower forearm supports together have a front portion with a S-shaped section.

10. The dual plane armrest according to claim 1, wherein said upper and lower forearm supports are disposed upon common legs extending below said lower forearm support.

11. The dual plane armrest according to claim 1, wherein said upper forearm support is cantilevered from said lower forearm support.

12. The dual plane armrest according to claim 11, wherein said upper forearm support has a front and is cantilevered at said front from said lower forearm support.

13. The dual plane armrest according to claim 1, further comprising a substantially continuous upright web linking said upper and lower forearm supports.

14. The dual plane armrest according to claim 1, wherein said upper forearm support and said lower forearm support have a rear hinge operable to displace said upper and lower forearm supports between a substantially upright stowed condition and a substantially horizontal deployed condition.

15. A dual armrest to be disposed between adjacent seats, the dual armrest comprising:
   an upper forearm support disposed at a given height from a floor; and
   a lower forearm support disposed at a height from the floor that is less than said given height, a first portion of the lower forearm support being at least one of wider and longer than the upper forearm support such that only a remaining second portion of said lower forearm support other than said first portion is located directly below said upper forearm support.

16. The dual armrest according to claim 15, wherein only a portion of said upper forearm support is located directly above said lower forearm support.

17. The dual armrest according to claim 15, wherein said upper forearm support is cantilevered from said lower forearm support.

18. The dual armrest according to claim 17, wherein said upper forearm support has a front and is cantilevered at said front from said lower forearm support.

19. The dual armrest according to claim 15, wherein said upper forearm support and said lower forearm support form at least one of a C-shape, a Z-shape, and an S-shape.

20. A dual armrest comprising an upper forearm support and a lower forearm support, the upper forearm support being disposed above the lower forearm support, wherein said upper forearm support and said lower forearm support have a rear hinge operable to displace said upper and lower forearm supports between a substantially upright stowed condition and a substantially horizontal deployed condition.

\* \* \* \* \*